United States Patent

[11] 3,614,293

| [72] | Inventor | A. C. Boyd |
| | | Knoxville, Tenn. |
| [21] | Appl. No. | 11,055 |
| [22] | Filed | Feb. 13, 1970 |
| [45] | Patented | Oct. 19, 1971 |
| [73] | Assignee | Fi-Shock, Inc. |
| | | Knoxville, Tenn. |

[54] ELECTRIC FENCE CONTROLLER
7 Claims, 5 Drawing Figs.

[52] U.S. Cl. .................................................... 174/52 R,
256/10, 336/92
[51] Int. Cl. ..................................................... H05c 1/02,
H05k 5/00
[50] Field of Search............................................ 174/52,
52.6; 336/90, 92; 256/10

[56] References Cited
UNITED STATES PATENTS

| 2,747,731 | 5/1956 | Bonanno ...................... | 174/52 |
| 3,387,244 | 6/1968 | Davis........................... | 336/92 |
| 3,403,366 | 9/1968 | Klatte et al. .................. | 174/52 X |

Primary Examiner—Darrell L. Clay
Attorney—Burns, Doane, Swecker & Mathis

ABSTRACT: An electric fence controller having a plastic case for enclosing the power transformer. The transformer is mounted in the case, spaced from the surrounding sides, top and bottom thereof, being seated upon shoulders provided on flange support members which serve both to confine the transformer transversely of the case and as supports. The cover has depending pins which engage the transformer at the opposite side from the shoulders, thus confining the transformer on the latter and retaining it in place. Posts are also mounted in the case, spaced at intervals about the transformer to confine it lengthwise in position. These supporting parts are formed in one integral piece with the adjacent parts of the plastic case.

PATENTED OCT 19 1971

3,614,293

INVENTOR
A. C. BOYD,
Burns, Doane, Benedict, Swecker & Mathis ATTORNEYS

ELECTRIC FENCE CONTROLLER

SUMMARY OF THE INVENTION

This invention relates to improvements in controllers for electric fences.

An electric fence controller customarily has a transformer mounted within a box that may be attached to a suitable support in the region of the electric fence. The transformer is adapted to be connected to the source of electric current, usually 115 v., and the output from the transformer is intended to be connected with the wire of the electric fence. This box is often placed out of doors and is required to protect the transformer from the weather. A metal box has been used heretofore for enclosing the transformer. This is expensive and subject to corrosion and it has not been satisfactory for the purpose.

One object of this invention is to improve the construction of controllers for electric fences and reduce the cost thereof.

Another object of the invention is to provide for the enclosing of the transformer within a nonmetallic case, which is also shockproof.

These objects may be accomplished, according to one embodiment of the invention, by providing a nonmetallic case or housing made of a suitable plastic material and enclosing the transformer. Provision is made for mounting the transformer spaced from all of the sides of the case or housing in a shockproof mounting. It is preferred that the mounting include supports having shoulders upon which the transformer is seated and is confined lengthwise by upstanding posts at the ends of the transformer and by pins depending from the cover and holding the transformer in seated positions on the shoulders. These parts are preferably formed in one integral piece with the adjacent parts of the case, thereby serving as shockproof supports for the transformer.

DETAILED DESCRIPTION OF DRAWINGS

Figure 1:
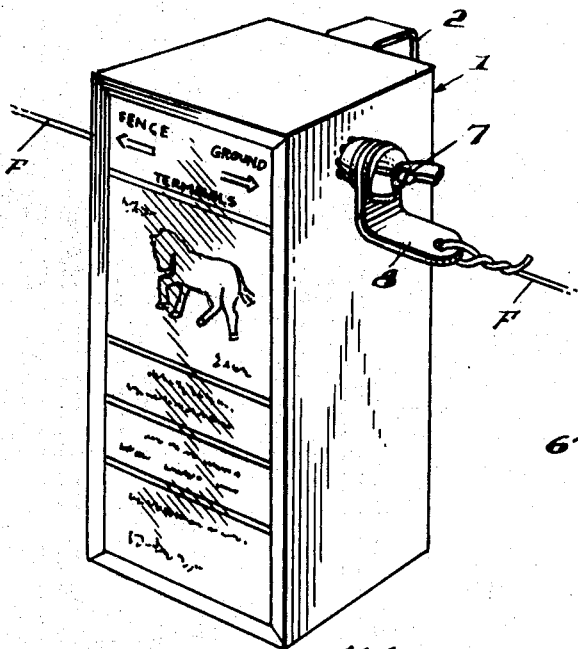
Figure 3:
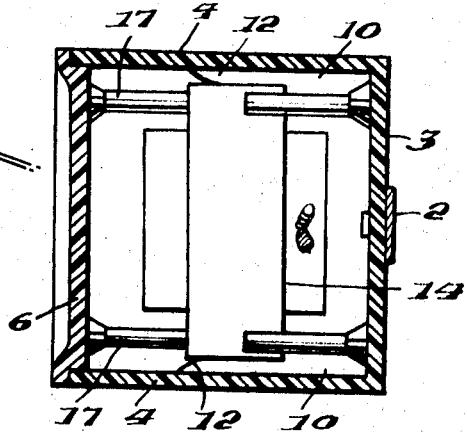
Figure 2:
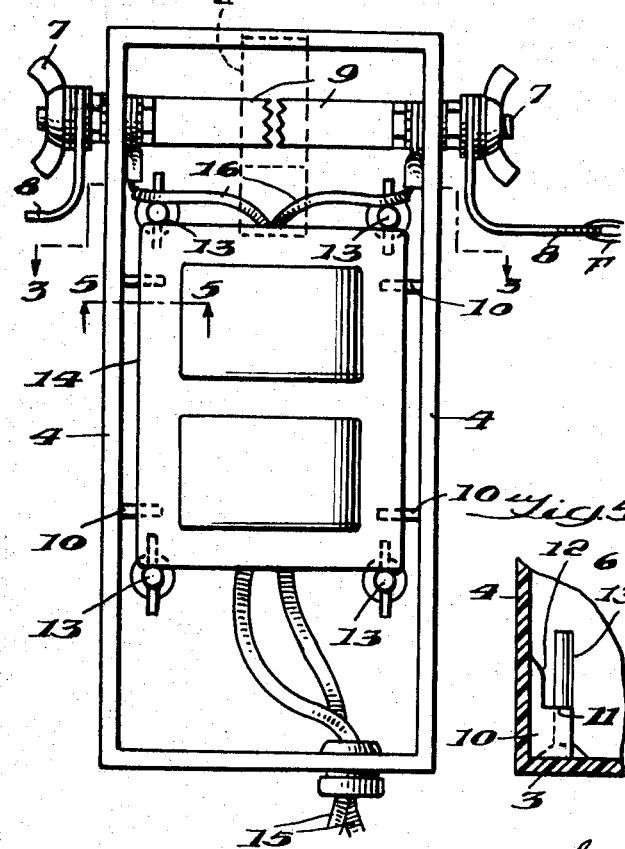
Figure 4:
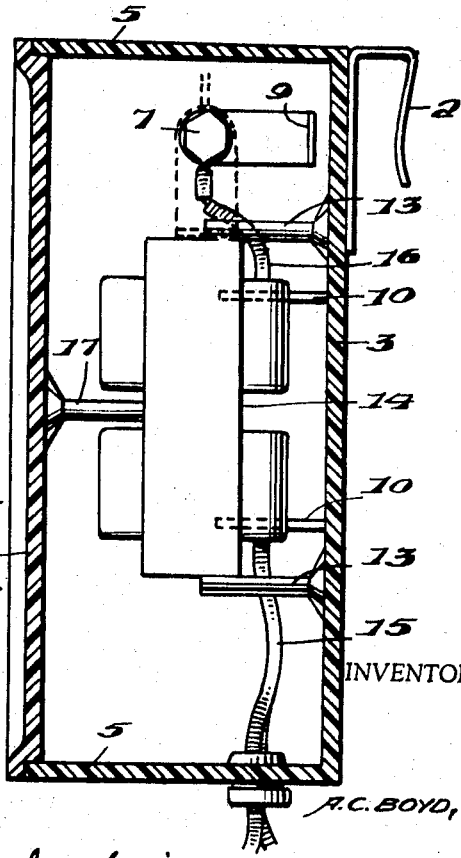
Figure 5:
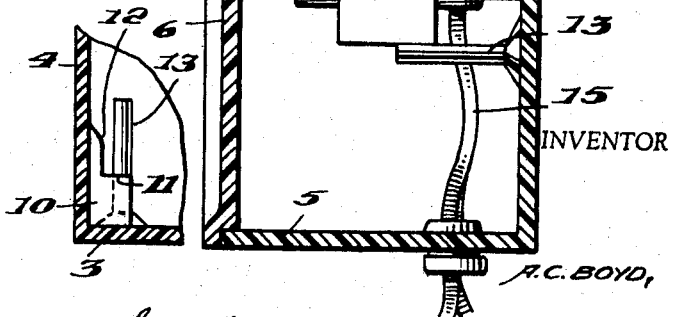

This embodiment is illustrated in the accompanying drawings, in which:

FIG. 1 is a perspective view of the controller;
FIG. 2 is a top plan view thereof, with the cover removed;
FIG. 3 is a cross section on the line 3—3 in FIG. 2;
FIG. 4 is a vertical section lengthwise through the controller; and
FIG. 5 is a detail cross section on the line 5—5 in FIG. 2.

DETAILED DESCRIPTION OF THE DISCLOSURE

The controller is indicated generally by the numeral 1 and is usually mounted in an exposed position out of doors, to be connected with sections of fence F. A bracket is shown at 2 for mounting the controller on a suitable support. This bracket is connected with the bottom 3 of the case or housing and which latter includes opposite sidewalls 4, end walls 5 and a cover 6. The cover 6 is preferably separate from the body of the housing and is adapted to be fitted over the edges of the sidewalls 4 and 5 and to be sealed thereto by a suitable adhesive. These parts forming the housing are preferably made from a suitable nonmetallic material, such as a plastic which will form an insulation and an exclusion of moisture.

Located in the opposite sides 4 of the case or housing are posts 7 for connecting the fence sections F to the operating parts of the controller. Brackets 8 may be provided on the posts 7 as suitable connecting means therefor.

Spaced contacts 9 are located in the case or housing and connected with the posts 7 forming a spark gap therebetween.

The sidewalls 4 have support members 10 connected therewith and extending inwardly therefrom, preferably in the form of ribs formed in one integral piece with the sidewalls 4 and with the bottom 3. Each of these support members 10 has a support shoulder 11 formed thereon spaced from the bottom 3 and with an outwardly extending edge portion 12 extending from the outer edge of the shoulder 11 to the inner face of the adjacent sidewall 4, as shown in FIG. 5.

Posts 13 are located on the bottom 3, spaced apart in pairs lengthwise of the case or housing. These posts 13 preferably are formed in one integral piece with the bottom and suitably braced at the point of connection therewith.

A transformer is shown at 14. The transformer usually provided is adapted to be connected with a source of 115 v. AC current through wires 15 and to reduce the voltage to a degree suitable for connection with the fence F according to the animals to be used in connection therewith. The output side of the transformer 14 is connected through wires 16 with the binding posts 7.

The transformer 14 is of unitary construction and assembly, of a size of wedged between the tapering edges 12 of the support members 10 until the transformer is seated upon the shoulders 11. The length of the transformer 14 is such as will be wedged between the posts 13. A pair of mounting pins 17 are formed integral with the cover 6 and extend therefrom into bearing relation with the top of the frame of the transformer 14 to hold it tightly upon the seats 11. The support of the transformer 14 in this manner will allow it to have sufficient yieldability due to shocks. The parts are substantially shockproof.

The mounting assembly, including the supports 10, posts 13 and pins 27, can be molded of a plastic material and the latter parts formed integral with the connected portions of the case or housing. This reduces appreciably the cost of the unit and it may also be made weathertight, with no danger of corrosion inside the controller. The binding posts 7, connected with plastic sides of the case or housing, eliminates the need for porcelain insulators which are subject to cracking, and these also would increase the possibility of corrosion.

The controller functions in the usual or desired manner to supply current continuously or intermittently to the fence F to be grounded through an animal's body in the usual way. Any suitable or desired control elements may be used in the controller as a part thereof according to the use to be made of the controller. The electrical details are not shown since these are well understood in the art, but may be used with the housing here involved in the relation shown.

The construction provides an inexpensive and lightweight controller which is effective for supplying current to an electric fence and may be mounted in any suitable or desired position.

While the invention has been illustrated and described in one embodiment, it is recognized that variations and changes may be made therein without departing from the invention set forth in the claims.

I claim:

1. A controller for an electric fence, comprising a housing having a bottom and surrounding side and end walls and a cover secured over the top of the housing, a transformer mounted in the housing and having surrounding edges spaced from the surrounding walls of the housing, means in the housing supporting the transformer above the bottom thereof and spaced from the sidewalls, and posts mounted on the bottom of the housing spaced from the surrounding side and end walls and spaced at the ends of the transformer at the surrounding edges thereof in position to hold the transformer in place on the supporting means in the housing.

2. A controller for an electric fence according to claim 1, wherein the posts are formed in one integral piece with the bottom of the housing and are upstanding therefrom.

3. A controller for an electric fence according to claim 1, wherein the housing bottom and sides are formed in one integral piece of nonmetallic material.

4. A controller for an electric fence according to claim 1, including pins formed in one integral piece with the cover spaced inwardly from the surrounding sides thereof and depending into bearing relation with the top of the transformer midway of the length thereof for holding said transformer in place.

5. A controller for an electric fence according to claim 1, including support members formed in one integral piece with the sides and bottom for supporting the transformer in place.

6. A controller for an electric fence, comprising a housing having a bottom and surrounding sides and a cover secured over the top of the housing, ribs extending inward from the opposite sides and having shoulders thereon spaced above the bottom, a transformer fitted between the inner edges of the ribs at the opposite sides of the housing and seated upon the shoulders, and posts mounted on the bottom spaced from the surrounding sides and upstanding from the bottom at the ends of the transformer for holding the transformer against endwise displacement on the shoulders.

7. A controller for an electric fence according to claim 6, including pins carried by the cover spaced inwardly of the surrounding sides thereof and depending into bearing relation with the top of the transformer midway of the length for holding said transformer on the shoulders.